United States Patent [19]

Nakanishi et al.

[11] Patent Number: 4,797,612
[45] Date of Patent: Jan. 10, 1989

[54] DEVICE FOR DETECTING ROTATING SPEED OF VEHICLE WHEEL

[75] Inventors: Nobuyasu Nakanishi; Noboru Noguchi; Hideyuki Aizawa; Kenzi Ito, all of Toyota, Japan

[73] Assignee: Toyota Jidosha Kabushiki Kaisha, Aichi, Japan

[21] Appl. No.: 69,900

[22] Filed: Jul. 6, 1987

[30] Foreign Application Priority Data

Jul. 8, 1986 [JP] Japan .......................... 61-104529[U]

[51] Int. Cl.⁴ ................................................ G01P 3/48
[52] U.S. Cl. .................................... 324/173; 324/174; 73/518; 73/519
[58] Field of Search .................. 324/173, 174; 73/518, 73/519; 361/240

[56] References Cited

U.S. PATENT DOCUMENTS

| | | | |
|---|---|---|---|
| 3,626,226 | 12/1971 | Pauwels et al. | 324/174 |
| 3,651,901 | 3/1972 | Burckhardt et al. | 73/519 |
| 3,870,911 | 3/1975 | Toyama et al. | 324/174 |
| 4,070,883 | 1/1978 | Kunz et al. | 324/174 |
| 4,161,120 | 7/1979 | Cloarec | 324/173 |
| 4,689,557 | 8/1987 | Smith et al. | 324/174 |

OTHER PUBLICATIONS

Instruction Manual for Mitsubishi "Galant EternaΣ" No. 1038830, Oct. 1984, pp. 3–38.

Primary Examiner—Gerard R. Strecker
Assistant Examiner—Maura K. Regan
Attorney, Agent, or Firm—Parkhurst, Oliff & Berridge

[57] ABSTRACT

A device for detecting a rotating speed of a wheel of a vehicle, including an axle hub having a shaft portion, and a flange portion which extends radially outwardly from one of opposite ends of the shaft portion such that the wheel is secured to the flange portion. The shaft portion has an intermediate section at which the axle hub is rotatably supported by a stationary member via a bearing. The detecting device further includes a rotor secured to a part of the shaft portion of the axle hub remote from the flange portion so that the rotor is rotatable with the wheel. The rotor has an externally toothed section which has a multiplicity of teeth spaced apart from each other in a circumferential direction of the rotor. A speed detector is supported by the stationary member, so as to detect the teeth of the toothed section of the rotor during rotation of the rotor. A covering member attached to the stationary member cooperates with the same to cover the rotor.

19 Claims, 1 Drawing Sheet

DEVICE FOR DETECTING ROTATING SPEED OF VEHICLE WHEEL

BACKGROUND OF THE INVENTION

1. Field of the Invention

The present invention relates in general to a device for detecting a rotating speed of a vehicle, and more particularly to a technique for improving the detecting accuracy of the device.

2. Discussion of the Prior Art

There is a need of sensing the rotating speed of a wheel of an automotive vehicle. For instance, the speed of the vehicle wheel is detected in controlling an anti-skid brake system of the vehicle. A typical example of such a speed-detecting device includes an axle hub, an annular rotor having a toothed portion with a multiplicity of circumferentially spaced-apart teeth, and a detector operable to detect the teeth of the rotor while the rotor is rotated. The axle hub has a shaft portion, and a flange portion which extends radially outwardly from one of opposite axial ends of the shaft portion. The shaft portion includes an intermediate section at which the axle hub is rotatably supported by a suitable stationary member of the vehicle via a bearing. The rotor is secured to the axle hub so that the rotor is rotated with the wheel secured to the axle hub. Conventionally, the rotor is secured at its one end to the flange portion of the axle hub, as disclosed in INSTRUCTION MANUAL for Mitsubishi new model car, "Galant Eterna Σ" (No. 1038830, Oct., 1984, page 3-38).

In the case where the rotor is secured to the radially outwardly extending flange portion of the axle hub, the rotor is subject to deformation as a result of deformation of the flange portion due to a bending moment repeatedly applied thereto upon turning motions of the vehicle. Consequently, the roundness of the toothed portion of the rotor is deteriorated, causing its teeth to be displaced toward and away from the axis of rotation of the rotor. Thus, the conventional detecting arrangement suffers from deterioration of the detecting accuracy during use. Although the above problem can be solved by using a massive axle hub with a rigid flange portion, this solution results in increasing the weight of the axle hub, and consequently an undesirable increase in the non-suspended or unsprung weight of the vehicle, which in turn leads to deterioriated driving comfort of the vehicle.

The conventional arrangement has another drawback that the flange portion of the axle hub is exposed to the external space, and consequently the rotor attached to the flange portion is contaminated with iron particles, muds, and other matters, which may cause inaccurate detection and damage of the detector. Further, the conventional arrangement requires anti-rust treatment of the rotor, which results in raising the cost of manufacture of the detecting device.

Further, the conventional arrangement requires a cumbersome procedure to remove the rotor, since the rotor is secured to the inner surface of the flange portion of the axle hub on the inner side of the vehicle, while being interposed between the flange portion of the axle hub and the bearing. Namely, the removal of the rotor requires costly steps for dismounting the axle hub from the stationary member.

SUMMARY OF THE INVENTION

It is accordingly an object of the present invention to provide a device capable of detecting a rotating speed of a wheel of a vehicle, with improved accuracy.

Another object of the invention is to provide such a detecting device which is economical to manufacture.

A further object of the invention is to provide such a detecting device which is protected against exposure to iron particles, muds and similar matters.

It is a still further object of the invention to provide such a detecting device which is easy to assemble and maintain.

According to the present invention, there is provided a device for detecting a rotating speed of a wheel of a vehicle, comprising: (a) an axle hub including a shaft portion, and a flange portion which extends radially outwardly from one of opposite axial ends of the shaft portion and which supports the wheel, the shaft portion having an intermediate section at which the axle hub is rotatably supported by a stationary member via a bearing; (b) a rotor secured to a part of the shaft portion remote from the flange portion such that the bearing is interposed between the rotor and the flange portion, so that the rotor is rotatable with the wheel, the rotor including an externally toothed section which has a multiplicity of teeth spaced apart from each other in a circumferential direction of the rotor; (c) a detector supported by the stationary member, and operable to detect the teeth of the externally toothed section of the rotor while the rotor is rotated; and (d) a covering attached to the stationary member, and cooperating with the stationary member to cover the rotor.

In the detecting device of the present invention constructed as described above, the part of the shaft portion of the axle hub remote from the flange portion is substantially free from deformation, even if the flange portion of the axle hub is deformed due to a bending moment applied during repeated turning motions of the vehicle. Therefore, the rotor secured to that part of the shaft portion extending through the bearing is protected against deformation, and is thus improved in its detecting accuracy. Further, the instant device eliminates the conventional need of forming the axle hub with a considerably massive flange portion having a high rigidity. As a result, the non-suspended or unsprung weight of the vehicle can be accordingly reduced, whereby the driving comfort of the vehicle is enhanced.

Further, since the rotor is covered by the stationary member and the covering attached to the stationary member, the rotor is protected from exposure to foreign matters such as iron particles and muddy substances, which may lead to a damage of the detector and deterioration of its detecting accuracy. Moreover, the instant device eliminates the conventionally required anti-rust treatment of the rotor. The elimination of the treatment contributes to lowering the cost of manufacture of the detecting device.

A further advantage of the present invention lies in easy and quick removal and installation of the rotor. More specifically, the rotor can be removed without an interference with the bearing and the flange portion of the axle hub, since the rotor is secured to the shaft portion of the axle hub, at a position on one side of the bearing remote from the flange portion. In other words, the rotor can be readily dismounted without having to remove the axle hub from the stationary member.

According to one feature of the present invention, the shaft portion of the axle hub has a shoulder surface and an externally threaded section, and the device further comprises a nut threaded on the externally threaded section such that the bearing is fixed while being sandwiched between the nut and the shoulder surface. The shaft portion of the axle hub further has an extension which extends axially from the externally threaded section in a direction away from the flange portion. The rotor is secured to the extension of the shaft portion. In this arrangment, the rotor can be removed from the extension of the shaft portion, without having to remove the nut, namely, while the axle hub remains supported by the stationary member.

In one form of the above feature of the invention, the rotor includes a cylindrical portion having the externally toothed section on an outer circumferential surface thereof, and further includes a flange portion which extends radially inwardly from the cylindrical portion. The rotor is secured at its flange portion to the extension of the shaft portion of the axle hub.

According to one arrangement of the above form of the invention, the cylindrical portion of the rotor accommodates therein at least a portion of the nut. This arrangement makes it possible to reduce the length of the axle hub. In another arrangement of the same form of the invention, the flange portion of the rotor is press-fitted on the extension of the shaft portion of the axle hub. In this latter arrangement, the rotor may have a recess which is engageable with a jig for removing the rotor from the extension of the axle hub.

According to another feature of the invention, the shaft portion of the axle hub has a shoulder surface and an externally threaded section, and the device further comprises a nut threaded on the externally threaded section such that the bearing and the rotor are fixed while being sandwiched between the nut and the shoulder surface. In this instance, the nut for retaining the bearing can be used also for securing the rotor to the shaft portion of the axle hub.

In one form of the above feature of the invention, the rotor includes a cylindrical portion which has the externally toothed section on an outer circumferential surface thereof, and further includes a flange portion which extends radially inwardly from the cylindrical portion. In this case, the flange portion of the rotor is firmly fixed by and sandwiched between the bearing and the nut. Preferably, the cylindrical portion of the rotor may accommodate therein at least a portion of the nut, so that the length of the shaft portion of the axle hub can be reduced.

According to a further feature of the invention, the detector comprises an electromagnetic pickup operable to generate an electric signal when each of the multiplicity of teeth of the externally toothed section of the rotor passes the detector.

In accordance with a still further feature of the invention, the stationary member comprises a steering knuckle which includes a cylindrical portion having a bore formed therethrough, and which further includes a plurality of arms which extend from an outer circumferential surface of the cylindrical portion of the steering knuckle.

In accordance with a yet further feature of the invention, the stationary member includes a cylindrical portion which accommodates the shaft portion of the axle hub and which has a hole formed through a radial wall thickness thereof. The detector is fluid-tightly fitted in the hole.

According to another feature of the invention, the stationary member includes a cylindrical portion which has a bore formed therethrough so that the shaft portion of the axle hub extends through the bore. The covering is adapted to close one of opposite axial open ends of the cylindrical portion of the stationary member remote from the flange portion of the axle hub.

In one form of the above feature of the invention, the covering includes a cylindrical wall, and an end wall closing one of opposite axial ends of the cylindrical wall thereof. The cylindrical wall of the covering is fluid-tightly fitted in the one axial open end of the cylindrical portion of the stationary member. The cylindrical wall of the covering may have a lip extending radially outwardly from an outer circumferential surface thereof, so that the lip is in abutting contact with the corresponding end face of the cylindrical portion of the stationary member, to thereby determine an axial length of fluid-tight engagement between the cylindrical wall of the covering and the cylindrical portion of the stationary member. The lip may be formed as an integral U-shaped part of the cylindrical wall of the covering, such that the U-shaped part is open in an inner circumferential surface of the cylindrical wall of the covering.

In another form of the above feature of the invention, the detecting device further comprises a sealing member which fills an annular space formed adjacent to the other axial open end of the cylindrical portion of the stationary member (remote from the above-indicated one open end closed by the covering), between an inner circumferential surface of the cylindrical portion of the stationary member and a corresponding outer circumferential surface of the shaft portion of the axle hub.

BRIEF DESCRIPTION OF THE DRAWINGS

The above and other objects, features and advantages of the present invention will be better understood by reading the following detailed description of preferred embodiments of the invention, when considered in connection with the accompanying drawings in which.

DETAILED DESCRIPTION OF THE PREFERRED EMBODIMENTS

Figure 1:
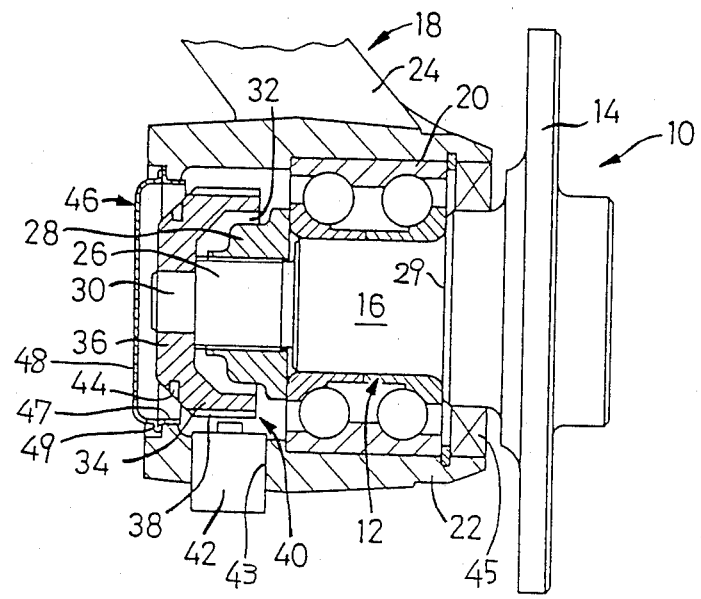
FIG. 1 is a front elevational view in cross section of one embodiment of a wheel-speed detecting device of the present invention, as attached to a steering knuckle of a vehicle.

Referring first to FIG. 1, reference numeral 10 designates an axle hub which includes a shaft portion 12, and a flange portion 14 which extends radially outwardly from one of opposite axial ends of the shaft portion 12. The shaft portion 12 has a plurality of sections having different diameters, which include an axially intermediate section 16 at which the axle hub 10 is rotatably supported by a stationary member in the form of a steering knuckle 18 of a vehicle, via a bearing 20. The steering knuckle 18 includes a cylindrical portion 22, and a pair of arm portions 24 (only one of these arms being shown in the figure) which extend from the outer circumferential surface of the cylindrical portion 22. The bearing 20 is fitted in the cylindrical portion 22, such that the intermediate section 16 of the shaft portion 12 of the axle hub 10 engages the bearing 20, whereby the shaft portion 12 is rotatably supported by the steering knuckle 18. The end of the intermediate section 16 remote from the flange portion 14 terminates in an externally threaded section 26 having a smaller diameter. A lock nut 28 is threaded on this externally threaded section 26. The other end of the intermediate section 16 on the side of the flange portion 14 is formed with a shoulder surface 29 having a larger diameter. With the lock nut 28 threaded on the threaded section 16, the axle hub 10 is rotatably supported on the cylindrical portion 22, such that the bearing 20 is sandwiched between the lock nut 28 and the shoulder surface 29, and such that the axle hub 10 is immovable in its axial direction.

An extension 30 projects from the end of the threaded section 26 in the axial direction away from the intermediate section 16. The extension 30 has a rotor 32 secured thereto. More specifically described, the rotor 32 includes a cylindrical portion 34, and a flange portion 36 which extends radially inwardly from one of opposite axial ends of the cylindrical portion 34. The rotor 32 is press-fitted at its flange portion 36 on the outer surface of the extension 30. The cylindrical portion 34 includes an externally toothed section 40 having a multiplicity of teeth 38. These teeth 38 are equally spaced apart from each other in the circumferential direction of the cylindrical portion 34. Opposite to the toothed section 40 of the rotor 32, there is disposed a speed detector in the form of an electromagnetic pickup 42. The pickup 42 is fluid-tightly fitted in a hole 43 formed through the thickness of the cylindrical portion 22 of the steering knuckle 18. While the vehicle is running with the rotor 32 rotating together with the axle hub 10, the electromagnetic pickup 42 detects the teeth 38 which have passed its detecting portion, and generates pulses having a frequency which corresponds to the number of the teeth 38 which have passed per unit time. The pulses generated by the pickup 42 are applied to a suitable arithmetic circuit (not shown), for conversion into a signal indicative of the rotating speed of the axle hub 10, i.e., of the wheel of the vehicle. The flange portion 36 of the rotor 32 has an annular recess 44 in its outer surface, so that a suitable tool or jig engages the recess 44 when the rotor 32 is removed from the extension 30 of the axle hub 10 by the tool. As shown in FIG. 1, the rotor 32 is enclosed by the cylindrical portion 22 of the steering knuckle 18, and a sealing member 45 and a protective covering 46 which are secured to the opposite axial ends of the cylindrical portion 22, respectively.

The covering 46 has a cylindrical wall 47, and a generally flat end wall 48 which closes one of opposite open ends of the cylindrical wall 47. The covering 46 is attached to the corresponding axial end of the cylindrical portion 22 of the steering knuckle 18, such that the cylindrical wall 47 is fluid-tightly fitted in the inner surface of the corresponding end part of the cylindrical portion 22. The cylindrical wall 47 is provided with a lip 49 extending radially outwardly by a suitable radial distance, so that the lip 49 is held in abutting contact with the corresponding end face of the cylindrical portion 22 of the knuckle 18. In this arrangement, the lip 49 determines an axial length of engagement between the cylindrical wall 47 of the covering 46, and the cylindrical portion 22 of the knuckle 18. The lip 49 is formed by suitable means as an integral U-shaped part of the cylindrical wall 47, such that the U-shaped lip 49 is open in the inner circumferential surface of the cylindrical wall 47, as shown in FIG. 1.

The sealing member 45 is disposed so as to fill an annular space formed between the end part of the shaft portion 12 remote from the extension 30, and the corresponding inner surface of the cylindrical portion 22 at its other open end remote from the above-indicated open end closed by the protective covering 46.

In the thus constructed detecting device wherein the rotor 32 is disposed at the end of the shaft portion 12 of the axle hub 10 remote from the flange portion 14, the rotor 32 is substantially free from an adverse influence by deformation of the flange portion 14 which may occur due to a bending moment applied to the axle hub 10. Further, the rotor 32 is accommodated in a totally enclosed space defined by the cylindrical portion 22 of the knuckle 18, the sealing member 45 and the protective covering 46, whereby the rotor is isolated from external iron particles, muddy substances and other foreign matters. Accordingly, no anti-rust treatment of the rotor 32 is required. Moreover, the illustrated detecting device of FIG. 1 permits easy removal of the rotor 32 simply by separating it from the extension 30 with a suitable jig engaging the annular recess 44, after the protective covering 46 is removed.

Figure 2:
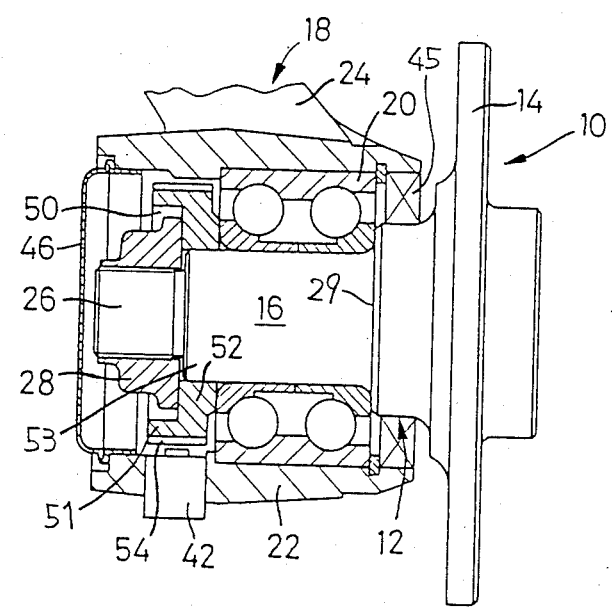
FIG. 2 is a front elevational view of another embodiment of the wheel-speed detecting device of the invention, as also attached to the steering knuckle.

Referring next to FIG. 2, there is illustrated a modified embodiment of the invention wherein the detecting device uses a rotor 50 which is firmly fixed by and sandwiched between the lock nut 28 and the bearing 20. Stated in more detail, the rotor 50 has a cylindrical portion 51 formed with an externally toothed section 54 at its outer surface, and a flange portion 52 which extends radially inwardly from one of opposite axial ends of the cylindrical portion 51. The flange portion 52 is fitted on a terminal part of the intermediate section 16 of the shaft portion 12 of the axle hub 10, which is remote from the shoulder surface 29. The flange portion 52 is forced against the bearing 20 by the lock nut 28, such that the corresponding end of the lock nut 28 is accommodated within the cylindrical portion 51.

While the rotor 32, 50 used in the illustrated embodiments is provided as a member separate from the lock nut 28, it is possible that the lock nut 28 serves also as a rotor. In this case, the lock nut is formed with an externally threaded portion having a multiplicity teeth to be detected by the detector 42.

While the present invention has been described in its preferred embodiments with a certain degree of particularity, it is to be understood that the invention is by no means limited to the precise details of the illustrated embodiments, but may be embodied with various changes, modifications and improvements, which may occur to those skilled in the art, without departing from the spirit and scope of the invention defined in the following claims.

What is claimed is:

1. A device for detecting a rotating speed of a wheel of a vehicle, comprising:
    an axle hub including a shaft portion, and a flange portion which extends radially outwardly from one of opposite axial ends of said shaft portion and which supports said wheel, said shaft portion having an intermediate section at which said axle hub is rotatably supported by a bearing device supported by a stationary member, said shaft portion further having a free end section which extends axially from said intermediate section in a direction away from said flange portion;
    a rotor secured to said free end section of said shaft portion such that said intermediate section and said bearing device are interposed between said rotor and said flange portion axially of said axle hub, so that said rotor is rotatable with said wheel and accessible without moving said bearing device, said rotor including an externally toothed section which has a multiplicity of teeth spaced apart from each other in a circumferential direction of the rotor;

a detector supported by said stationary member, and operable to detect said teeth of said externally toothed section of said rotor while said rotor is rotated; and a covering attached to said stationary member, and cooperating with said stationary member to cover said rotor.

2. A device according to claim 1, wherein said shaft portion of said axle hub has a shoulder surface and an externally threaded section, said device further comprising a nut threaded on said externally threaded section such that said bearing device is fixed while being sandwiched between said nut and said shoulder surface, said shaft portion of said axle hub further having an extension which extends axially from said externally threaded section in a direction away from said flange portion, said rotor being secured to said extension of said shaft portion.

3. A device according to claim 1, wherein said detector comprises an electromagnetic pickup operable to generate an electric signal when each of said multiplicity of teeth of said externally toothed section of said rotor passes said detector.

4. A device according to claim 1, wherein said stationary member comprises a steering knuckle which includes a cylindrical portion having a bore formed therethrough, and which further includes at least one arm which extends from an outer circumferential surface of said cylindrical portion of the steering knuckle.

5. A device according to claim 1, wherein said stationary member includes a cylindrical portion which accommodates said shaft portion of said axle hub and which has a hole formed through a radial wall thickness thereof, said detector being fluid-tightly fitted in said hole.

6. A device according to claim 1, wherein said stationary member includes a cylindrical portion which has a bore formed therethrough so that said shaft portion of said axle hub extends through said bore, said covering closing one of opposite axial open ends of said cylindrical portion of said stationary member remote from said flange portion of said axle hub.

7. A device according to claim 6, wherein said covering includes a cylindrical wall, and an end wall closing one of opposite axial ends of said cylindrical wall thereof, said cylindrical wall of said covering being fluid-tightly fitted in said one axial open end of said cylindrical portion of said stationary member.

8. A device according to claim 7, wherein said cylindrical wall of said covering has a lip extending radially outwardly from an outer circumferential surface thereof, said lip being held in abutting contact with the corresponding end face of said cylindrical portion of said stationary member, and thereby determining an axial length of fluid-tight engagement between said cylindrical wall of said covering and said cylindrical portion of said stationary member.

9. A device according to claim 8, wherein said lip is formed as an integral U-shaped part of said cylindrical wall of said covering, said U-shaped part being open in an inner circumferential surface of said cylindrical wall of said covering.

10. A device according to claim 6, further comprising a sealing member which fills an annular space formed adjacent to the other axial open end of said cylindrical portion of said stationary member, between an inner circumferential surface of said cylindrical portion of the stationary member and a corresponding outer circumferential surface of said shaft portion of said axle hub.

11. A device for detecting a rotating speed of a wheel of a vehicle, comprising:

an axle hub including a shaft portion, and a flange portion which extends radially outwardly from one of opposite axial ends of said shaft portion and which supports said wheel, said shaft portion having an intermediate section at which said axle hub is rotatably supported by a stationary member via a bearing, an externally threaded section which extends axially from said intermediate section in a direction away from said flange section, an extension which extends axially from said externally threaded section in said direction away from said flange section, and a shoulder surface between said intermediate section and said flange portion;

a rotor secured to said extension of said shaft portion such that said bearing is interposed between said rotor and said flange portion, said rotor including an externally toothed section which has a multiplicity of teeth spaced apart from each other in a circumferential direction of the rotor;

a nut threaded on said externally threaded section such that said bearing is fixed while being sandwiched between said nut and said shoulder face;

a detector supported by said stationary member, and operable to detect said teeth of said externally toothed section of said rotor while said rotor is rotated; and a covering attached to said stationary member, and cooperating with said stationary member to cover said rotor.

12. A device according to claim 11, wherein said rotor includes a cylindrical portion having said externally toothed section on an outer circumferential surface thereof, and further includes a flange portion which extends radially inwardly from said cylindrical portion, said rotor being secured at said flange portion thereof to said extension of said shaft portion of the axle hub.

13. A device according to claim 12, wherein said cylindrical portion of said rotor accommodates therein at least a portion of said nut.

14. A device according to claim 12, wherein said flange portion of said rotor is press-fitted on said extension of said shaft portion of the axle hub.

15. A device according to claim 14, wherein said rotor has a recess which is engageable with a jig for removing said rotor from said extension of said axle hub.

16. A device for detecting a rotating speed of a wheel of a vehicle, comprising:

an axle hub including a shaft portion, and a flange portion which extends radially outwardly from one of opposite axial ends of said shaft portion and which supports said wheel, said shaft portion having an intermediate section at which said axle hub is rotatably supported by a stationary member via a bearing, an externally threaded section which extends axially from said intermediate section in a direction away from said flange section, and a shoulder surface between said intermediate section and said flange portion;

a rotor secured to said intermediate section of said shaft portion such that said bearing is interposed between said rotor and said flange portion, said rotor including an externally toothed section which has a multiplicity of teeth spaced apart from each other in a circumferential direction of the rotor;

a nut threaded on said externally threaded section such that said bearing and said rotor are fixed while being sandwiched between said nut and said shoulder face;

a detector supported by said stationary member, and operable to detect said teeth of said externally toothed section of said rotor while said rotor is rotated; and a covering attached to said stationary member, and cooperating with said stationary member to cover said rotor.

17. A device according to claim 16, wherein said shaft portion of said axle hub has a shoulder surface and an externally threaded section, said device further comprising a nut threaded on said externally threaded section such that said bearing and said rotor are fixed while being sandwiched between said nut and said shoulder surface.

18. A device according to claim 17, wherein said rotor includes a cylindrical portion which has said externally toothed section on an outer circumferential surface thereof, and further includes a flange portion which extends radially inwardly from said cylindrical portion, said flange portion of said rotor being firmly fixed by and sandwiched between said bearing and said nut.

19. A device according to claim 18, wherein said cylindrical portion of said rotor accommodates therein at least a portion of said nut.

* * * * *